United States Patent
Peterson

[15] 3,686,551
[45] Aug. 22, 1972

[54] SYNCHRONOUS MOTOR FIELD REGULATOR CONTROL

[72] Inventor: Robert S. Peterson, Williamsville, N.Y.

[73] Assignee: Westinghouse Electric Corporation, Pittsburgh, Pa.

[22] Filed: July 30, 1971

[21] Appl. No.: 167,587

[52] U.S. Cl. ........................... 318/174, 318/179
[51] Int. Cl. ........................................ H02p 7/36
[58] Field of Search ............... 318/174, 178, 179

[56] References Cited

UNITED STATES PATENTS

| | | |
|---|---|---|
| 3,383,575 | 5/1968 | Bobo ..................... 318/179 |
| 3,427,471 | 2/1969 | South ..................... 318/179 |
| 3,538,408 | 11/1970 | Peterson ............... 318/179 X |

*Primary Examiner*—Gene Z. Rubinson
*Attorney*—F. H. Henson et al.

[57] ABSTRACT

A synchronous motor field regulator system which regulates for a specific power factor within a predetermined line voltage band, providing that a minimum excitation requirement for the load on the synchronous motor is met. KVAR balance control is also provided for two synchronous motor regulated drives connected to the same line.

8 Claims, 3 Drawing Figures

Patented Aug. 22, 1972

SYNCHRONOUS MOTOR FIELD REGULATOR CONTROL

BACKGROUND OF THE INVENTION

As is known, alternating current line voltage variations which result from fluctuating demands on the distribution system are a continual problem in industrial mills and plants. If the distribution system has little line impedance, the line voltage variation will be small. When the distribution system has a high line impedance, the line voltage variation can be high, the distribution transformer being the largest contributor to system impedance. The system line voltage swings can be the result of variation in power demand or kilovar demand. The fluctuating power demand is the result of energy spent in the plant and little can be done about this. The variation in kilovar demand can be used to compensate for line voltage variations caused by the fluctuating power demand. The lagging (i.e., inductive) kilovars which cause line voltage dips increase as a result of using more static thyristor direct current drives on industrial drive applications. At speeds below the direct current motor base speed, these thyristor drive systems generate inductive kilovars. These drives, together with all the induction motors used in a plant, contribute most of the inductive kilovars generated in the distribution system.

To maintain the line voltage, other means within the plant must be used to generate corrective (i.e., capacitive) kilovars to compensate for the lagging kilovars. Static capacitors are not suitable for this purpose since their capacitance cannot be varied on a continuous, cyclic basis. What is required is a simple means of generating corrective kilovars continuously to maintain a constant line voltage.

The best means for accomplishing the generation of corrective or capacitive kilovars is the use of synchronous motor drives. By varying the synchronous motor field excitation, the synchronous motor corrective or capacitive kilovars can be varied to correct for line voltage drops caused by a fluctuating power and inductive kilovar demand on the distribution system. In the past, power factor field excitation regulators have been applied to synchronous motors based on the premise that if the motor power factor is maintained at a given value, the motor line voltage will be maintained. This conclusion, however, is in error. It is true that there is a correlation between motor power factor and line voltage; and it is also true that if the synchronous motor loads are only positive (motoring), then the line voltage variation caused by the motor positive load will tend to be constant by maintaining a given power factor. What the power factor has to be is an unknown which in most cases requires a detailed system analysis to determine its value. If the motor load is regenerative as well as motoring, the line voltage will rise higher if the synchronous power factor is regulating at a given capacitive power factor. Both the regenerative load and the capacitive kilovars are now in a direction to cause the line voltage to rise. Under these circumstances, the power factor regulator is not accomplishing what it is intended to do.

Instead of using a synchronous motor power factor regulator, a synchronous motor line voltage regulator can be used to ultimately control the line voltage. If line voltage regulation is used, the electrical supplier must protect his synchronous motor from a thermal overload condition if other loads on the distribution system cause a severe cyclic line voltage dip or a sustained line voltage dip for a long period of time. A synchronous motor has only so much thermal capacity, and when it is exceeded as a result of having a high line current and/or field current for a long period of time, the motor life will be shortened. For that matter, under severe overload conditions, the motor can be damaged very quickly. As a result, this condition has caused electrical suppliers in the past to be reluctant in supplying line voltage regulators.

Finally, in the design of any synchronous motor field excitation regulator, consideration must be given to prevention of motor pull-out under peak loads. In the past, synchronous motor field excitation regulators could not guaranty sufficient motor field flux to prevent the motor from pulling out at heavy loads if the power factor to line voltage controller called for a field flux which was below the flux level required to hold the load. At light loads, prior art power factor regulators attempted to maintain a power factor. However, attempting to maintain a desired power factor at light loads is impossible and results in sustained oscillations in the regulator system.

SUMMARY OF THE INVENTION

In accordance with the present invention, a synchronous motor field current regulator is provided which overcomes the above and other disadvantages of prior art regulators of this type. Specifically, there is provided a motor field current regulator wherein an inner field current loop, responsive to torque on the motor, is provided for preventing the motor from pulling out of synchronism for normal peak loads. Additionally, two outer control loops are provided. The first of these is a line voltage control loop which maintains the alternating current line voltage between minimum and maximum values regardless of the synchronous motor power factor. The second loop, a power factor loop, regulates for a given power factor between the minimum and maximum line voltages. In certain cases, this power factor loop can be eliminated; but when it is used, it is disconnected from the system at light loads when effective power factor correction is impossible, while the line voltage loop maintains the minimum value of line voltage.

In the case where two synchronous motors are connected to the same distribution system, a KVAR balance loop is provided between the two synchronous motor regulators whose error signal is an input to the line voltage loop. In this manner, the two synchronous motors will share the corrective (i.e., capacitive) KVARS that must be generated to maintain a desired alternating current line voltage.

Thus, instead of using a power factor control loop only or a line voltage control loop only, the present invention combines the advantages of both with an inner field current loop responsive to torque on the motor for preventing the motor from pulling out of synchronism for normal peak loads.

The above and other objects and features of the invention will become apparent from the following detailed description taken in connection with the accompanying drawings which form a part of this specification, and in which.

Figure 1:
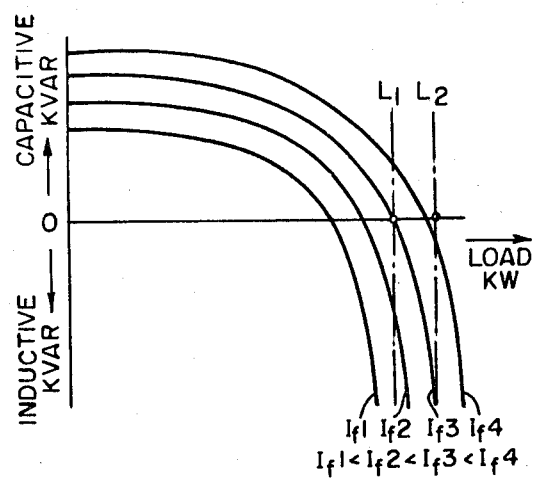
FIG. 1 is a plot of kilovars versus load on a synchronous motor, showing the manner in which the kilovars can be made capacitive or inductive, depending upon the synchronous motor field current.

With reference now to the drawings, and particularly to FIG. 1, there is shown a plot of kilovars versus load on a synchronous motor. It can be seen that for any given value of field current $I_f$, the kilovars are capacitive at light loads but become inductive at heavier loads on an elliptical curve. As was explained above, it is desirable, in electrical distribution systems, to generate capacitive kilovars continuously to maintain a constant line voltage. This can be achieved for a particular load by varying the field current of the synchronous motor.

The group of curves in FIG. 1 illustrate the conditions which occur for increasing field currents. Let us assume, for example, that the load on the synchronous motor is at point $L_1$. Under these conditions, the field current must exceed the value $I_f3$ in order for the synchronous motor to generate capacitive kilovars. This will occur (i.e., capacitive kilovars) when the field current, for example, is at a value $I_f4$. Thus, for any given load on the synchronous motor, it can be made to generate capacitive kilovars by increasing field current, providing the synchronous motor is not saturated. If the field current is $I_f3$, the synchronous motor will pull out of synchronism for loads greater than $L_2$ ($L_2$ load line is tangent to KVAR versus load curve for field current $I_f3$). In order for the synchronous motor to stay in synchronism at load $L_2$, the field current must be greater than $I_f3$.

Figure 2:
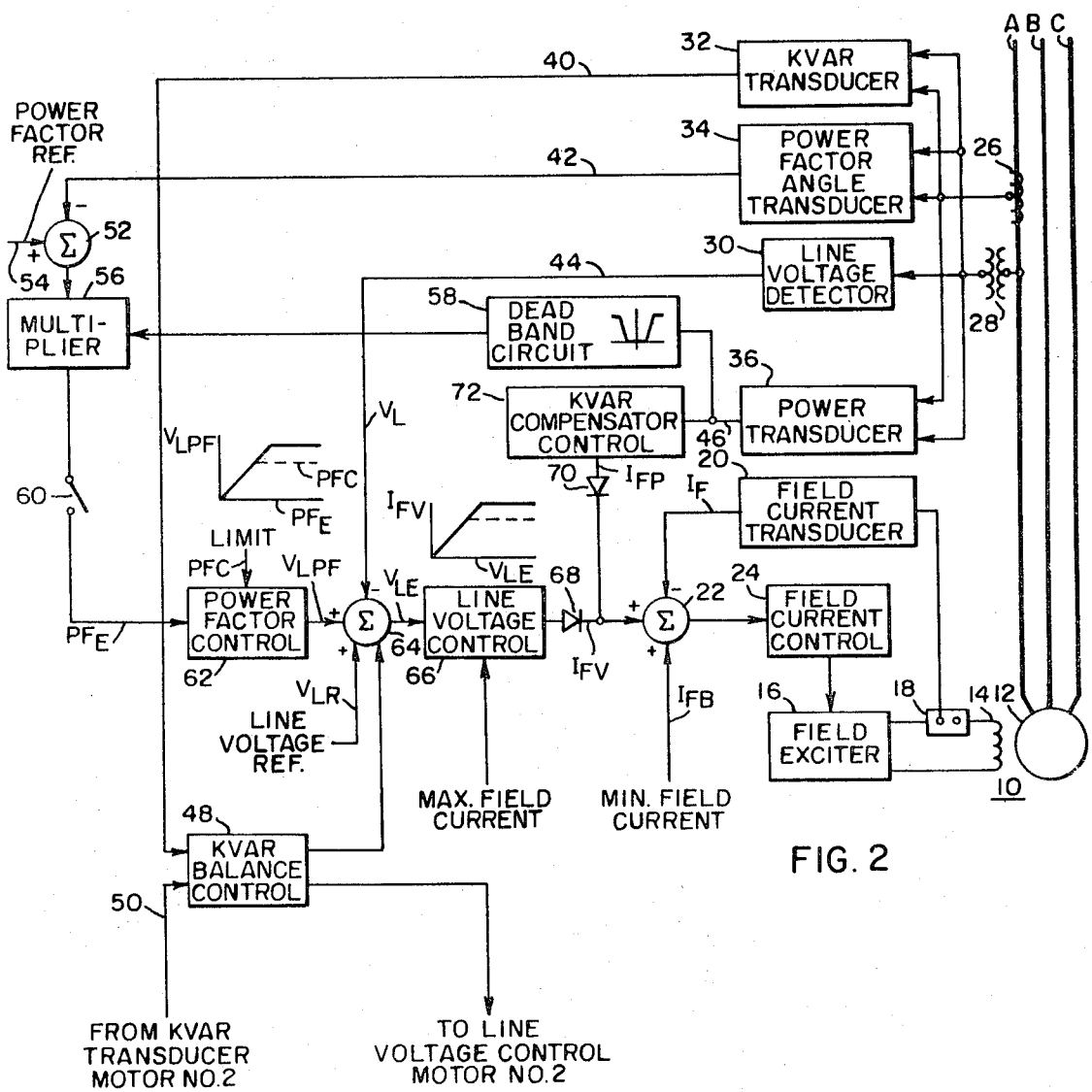
FIG. 2 is a block diagram of the general overall control scheme of the invention.

With reference now to FIG. 2, a simplified block diagram of the control system of the present invention is shown. The synchronous motor 10 includes an armature 12, usually comprising a stator, and field winding 14, usually carried on a rotor and connected to a field excitation circuit 16. Actual current in the field winding 14 is sensed by means of a shunt 18 and fed back through a field current transducer 20 to a summing point 22 and, thence, into a field current control circuit 24 which controls the excitation circuit 16.

The armature 12 is supplied by the three phases A, B and C of a three-phase alternating current supply, not shown. Actual line current in the three-phase supply is sensed by means of a current transformer 26; while actual line voltage is sensed by means of a voltage transformer 28. The voltage transformer 28 is connected to a line voltage detector 30, as well as to a KVAR transducer 32, a power factor angle transducer 34 and a power transducer 36. The current transformer 26, on the other hand, is connected only to the KVAR transducer 32, the power factor angle transducer 34 and the power transducer 36 since it is necessary to use both voltage and current factors in these transducers.

The KVAR transducer 32 may comprise, for example, a Halltiplier (Trademark) of the type manufactured by Scientific Columbus, Inc. of Columbus, Ohio. It produces an output on lead 40 proportional to the kilovars being supplied to the synchronous motor 10. The power factor angle transducer may be a Halltiplier (Trademark) power factor transducer, Model 1543, also manufactured by Scientific Columbus, Inc. of Columbus, Ohio. It produces an output on lead 42 proportional to the power factor angle, either positive or negative, of the power being supplied to the synchronous motor. The line voltage detector 30, of course, is simply a transformer and a three-phase bridge rectifier which produces a signal on lead 44 proportional to actual line voltage. The power transducer 36, which produces a signal on lead 46 proportional to power being supplied to the synchronous motor 10, is a type of wattmeter such as Model VP-840 — "Hall Effect" Transducer manufactured by Westinghouse Electric Corporation, Newark, N. J.

The output of the KVAR transducer 32 is applied through lead 40 to a KVAR balance control circuit 48 to which is also connected the output of a KVAR transducer for a second synchronous motor connected to the input leads A, B and C, assuming that such a second motor is employed. The output of the power factor angle transducer 34 is applied through lead 42 to a summing point 52 where it is compared with a power factor angle reference signal on lead 54. While shown in FIG. 2 as a single reference on lead 52, it will be seen hereinafter that this is actually two reference signals, one of which is of one polarity for positive power factor angles and the other of which is of the opposite polarity for negative power factor angles. The difference or error signal is then applied to a multiplier 56 where it is multiplied with the power signal from dead-band circuit 58 connected to power transducer 36. The reason for multiplier 56 and dead-band circuit 58 will hereinafter be explained in detail.

From the multiplier 56, a power factor correction signal is applied through switch 60 to a power factor control circuit 62. The output of this circuit is then compared at summing point 64 with a line voltage reference signal and the actual line voltage signal on lead 44. From summing point 64, the signal is then applied to a line voltage control circuit 66 to which is also applied the output of the KVAR balance control 48. Finally, the output of the line voltage control circuit 66 is passed through a diode 68 to summing point 22.

Also applied to the summing point 22 through diode 70 is the output of a KVAR compensator control (or torque compensator) circuit 72 connected to the output of power transducer 36. As will be appreciated, the diodes 68 and 70 comprise an auctioneering circuit wherein only the largest of the two signals from the circuit 72 and the line voltage control circuit 66 is applied to the summing point 22. That is, the inner field current or flux loop regulates for a given field current or simulated field flux which is proportional to the larger of two signals, either the alternating current line power to the synchronous motor as derived from circuit 72 or the alternating current line voltage output of controller 66.

The operation of each of the control loops will now be described. The inner field current loop comprising power transducer 36, KVAR compensator control 72 and field current control circuit 24 regulates for a given field current which follows the field current reference signal $I_{FP}$ from circuit 72 plus the minimum field current reference signal $I_{FB}$. At no load, the field current reference is $I_{FB}$. However, as the load increases, the other part of the current reference signal $I_{FP}$ increases proportionally. The rate of increase of $I_{FP}$ with load can be different for positive and negative loads, the latter being the smaller since corrective (i.e., capacitive) kilovars with a regenerative load will cause a line voltage rise. The field current is increased for increased negative loads only to insure that the synchronous motor will not pull out of synchronism for normal peak loads. For positive increasing loads, the field current is increased to maintain synchronism and also generate corrective kilovars to maintain the line voltage.

The purpose of this inner field current loop is to permit field forcing of the synchronous motor field current. When the field current $I_F$ from field current transducer 20 does not match the current reference signal ($I_{FP} + I_{FB}$), the field current controller amplifies this error signal, $I_{FE}$, causing the field exciter current from circuit 16 to correct very rapidly. With the inner field current loop, the time delay between the current reference signal and the field current is the synchronous motor transient field time constant which can be as high as 2 seconds. If the field forcing factor (maximum field exciter voltage/rated field voltage) is four, this time delay can be reduced to 0.4 second maximum for large changes in field current and 0.05 second for small changes in field current. Thus, the use of this inner field current loop permits the control system to respond very rapidly to load variations.

The line voltage control loop includes the line voltage detector 30 and the line voltage control circuit 66. The line voltage control circuit 66 amplifies the line voltage error $V_{LE}$; and its output signal $I_{FV}$ is another field current reference signal to the inner field current loop just described. However, as mentioned above, only the larger of the two signals $I_{FP}$ or $I_{FV}$ will pass to the summation point 22 because of the diodes 68 and 70. $I_{FP}$ guarantees a minimum field current as a function of motor load, thus preventing motor pull-out when the line voltage control circuit 66 is trying to reduce field current to prevent the line voltage from rising. This condition can occur, for example, when a large regenerative load is applied to the synchronous motor and a high field current is required to maintain synchronism. When positive loads are applied to the motor, both the output of circuit 72 and the line voltage control circuit 66 will call for an increase in field current with the larger of these two current reference signals controlling the motor field current.

The power factor control loop includes the multiplier 56 which multiplies the difference between the power factor angle signal on lead 42 and the power factor reference signal on lead 54 by the power signal at the output of transducer 36 which has passed through dead-band circuit 58. By multiplying the power factor correction signal by the power signal, the gain variation of the loop with load changes is minimized; and, because of the dead-band circuit 58 which will not pass signals below a predetermined magnitude, the output of the multiplier will be zero at light loads, meaning that power factor control cannot be effective at light loads where oscillations can occur. Alternatively, the power factor control loop can be completely switched out of the system by opening switch 60.

Assuming that the switch 60 is closed, the output of the multiplier 56 comprising the power factor angle error $PF_E$ is amplified in the power factor control circuit 62 to produce another line voltage reference signal, $V_{LPF}$, which is applied to summing point 64. That is, the output of the power factor control circuit, $V_{LPF}$, is added with the line voltage reference signal $V_{LR}$ and compared with the actual line voltage signal $V_L$ to derive the error signal $V_{LE}$ for the line voltage control circuit 66. If the power factor angle is greater than the reference angle as determined by the signal on lead 54, the power factor controller output $V_{LPF}$ goes to zero since the power factor controller is not permitted to reduce the line voltage below the minimum line voltage normal setting $V_{LR}$. The maximum line voltage $V_{LM}$ that the power factor controller can call for is determined by the saturation level PFC of this controller where PFC equals $V_{LM} - V_{LR}$. The result is that the power factor controller 62 can regulate for the power factor angle reference in the line voltage band from $V_{LR}$ to $V_{LM}$. When the line voltage is outside the band, the power factor loop is disconnected and the line voltage loop now controls the synchronous motor field current. Likewise, and as explained above, if at any time the line voltage controller calls for a field current $I_{FV}$ which is smaller than the KVAR or torque compensator control output $I_{FP}$, the line voltage loop is disconnected by virtue of the diodes 68 and 70; and the torque compensator loop now controls the synchronous motor field current.

Figure 3:
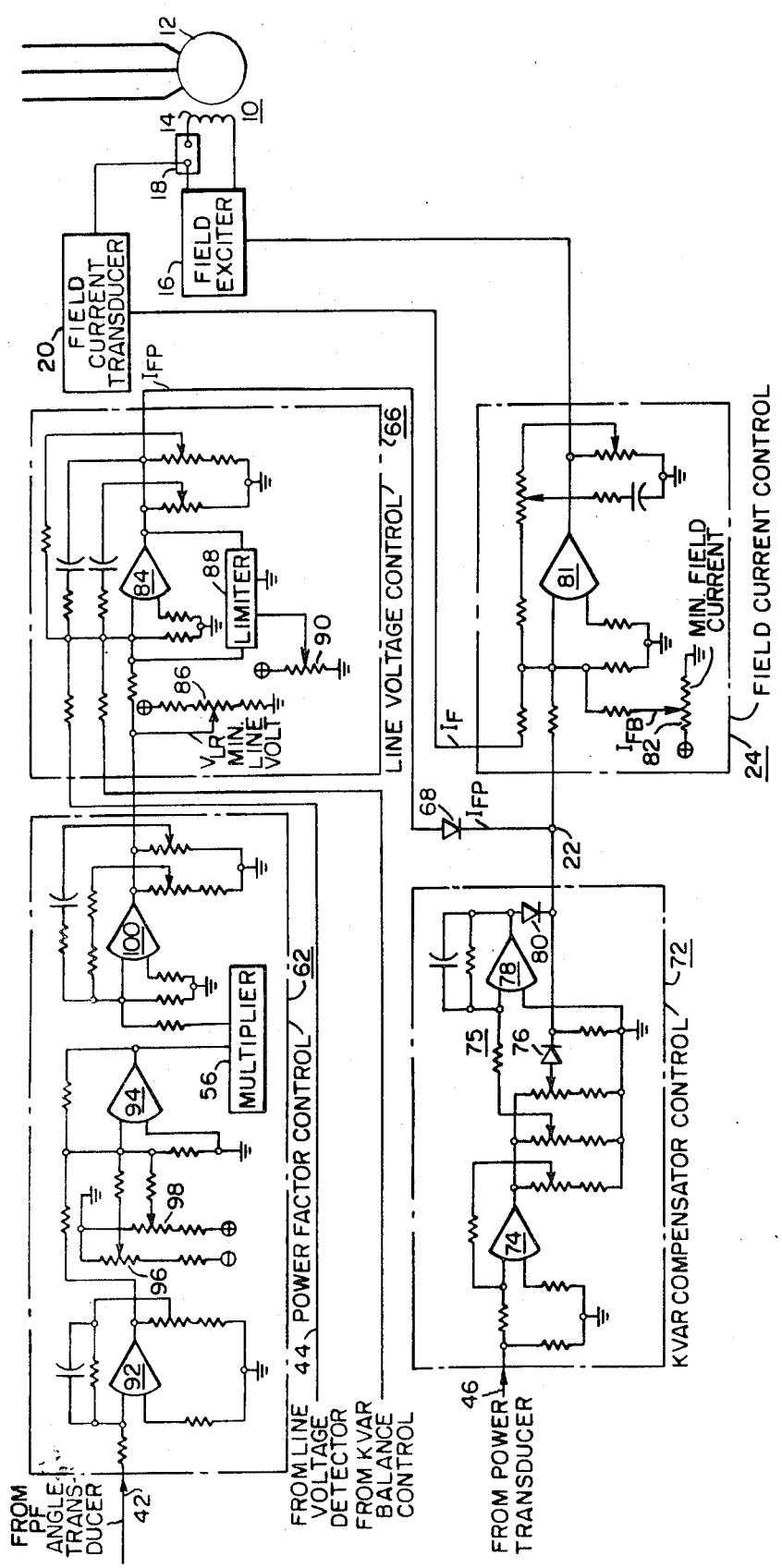
FIG. 3 is a detailed schematic circuit diagram of the control system of the invention.

A simplified detailed schematic circuit diagram of the system is shown in FIG. 3. Certain elements of the circuit, such as power supplies, limiters and the like have been eliminated for purposes of simplicity but can be readily supplied by those skilled in the art. Elements in FIG. 3 which correspond to those of FIG. 2 are identified by like reference numerals.

The signal on lead 46 from power transducer 36 (not shown in FIG. 3) is applied to the input of a proportional operational amplifier 74 in the KVAR or torque compensator control circuit 72. The output of amplifier 74 is applied to a positive value circuit 75. That is, the output is applied directly through diode 76 to the summing point 22 and is also applied through operational amplifier 78 through diode 80 to the summing point 22. Amplifier 78 has a capacitive feedback path as shown and acts to invert the signal. In this manner, the signal at the output of circuit 72 will always have the same polarity as applied to summing point 22. The use of amplifier 78 enables the rate of increase of $I_{FP}$ with load to be different for positive and negative loads for the reasons explained above. The signal at summing point 22 is then applied to operational amplifier 81 in the field current control circuit 24. Also applied to the input of the operational amplifier 81 is a voltage derived from tap 82; and this determines the minimum field current, $I_{FB}$, for the synchronous motor. Additional inputs to the operational amplifier 81 include the signal $I_F$ from transducer 20 and the signal $I_{FP}$ at the output of line voltage control circuit 66.

The inputs to the line voltage control circuit 66 are that on lead 44 from the line voltage detector 30, that from the KVAR balance control circuit 48, and the output of the power factor control circuit 62. These three signals are applied to the input of an operational amplifier 84 in line voltage control circuit 66 along with a potential derived from potentiometer 86 which is the line voltage reference signal $V_{LR}$ identified in FIG. 2. In shunt with the operational amplifier 84 is a limiter 88 having one of its inputs connected to a potentiometer 90 which determines maximum field current to the synchronous motor. That is, regardless of the line voltage, the limiter 88 will control the magnitude of the signal $I_{FP}$ to an upper maximum limit as determined by the tap on potentiometer 90 to prevent a possible overload condition on the synchronous motor. The output of operational amplifier 84 is applied through diode 68, also shown in FIG. 2, to the summing point 22.

The power factor control circuit 62 includes a first operational amplifier 92 to which the power factor signal on lead 42 from transducer 34 is applied. The amplifier 92 acts primarily to amplify the input signal which is then combined with one of two reference signals and applied to the input of a second operational amplifier 94. These reference signals are derived from one of two potentiometers 96 and 98. Potentiometer 96 determines the maximum capacitive power factor angle; while potentiometer 98 determines the maximum inductive power factor angle. Depending upon whether the power factor angle is positive or negative, it will be subtracted from one of the reference signals applied by potentiometers 96 and 98 and applied through amplifier 94 to the multiplier 56, also identified in FIG. 2. The multiplier 56 tries to maintain the gain of the loop constant as explained above and also acts to prevent power factor error signals from being applied to the line voltage control circuit 66 by virtue of the dead-band circuit 58 for small synchronous motor loads. From multiplier 56, the power factor error signal is then applied through amplifier 100 to one of the inputs of the line voltage control circuit 66 as signal $V_{LPF}$ identified in FIG. 2.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In apparatus for varying the field current of a synchronous motor to vary the motor capacitive kilovars and correct for line voltage drops caused by a fluctuating power and inductive kilovar demand, the combination of means for producing an electrical signal which varies as a function of the line voltage supplied to said motor, means responsive to said signal for varying the field current supplied to said synchronous motor to maintain said line voltage between predetermined minimum and maximum values, means for producing a second electrical signal which varies as a function of the electrical power supplied to said motor, and means responsive to said second signal for increasing the field current supplied to said synchronous motor irrespective of line voltage to prevent pull-out of the synchronous motor.

2. The apparatus of claim 1 wherein the means responsive to said first-mentioned signal comprises an operational amplifier having means for adjusting its minimum and maximum outputs to establish the minimum and maximum values of said line voltage.

3. The apparatus of claim 1 wherein said means for producing a second electrical signal comprises a power transducer responsive to both the current and voltage supplying said synchronous motor.

4. The apparatus of claim 1 including means for producing a third electrical signal which varies as a function of the power factor angle of power supplied to said synchronous motor, and means responsive to said third electrical signal for regulating the field current supplied to said synchronous motor between said predetermined minimum and maximum values of line voltage.

5. The apparatus of claim 4 including means for multiplying said third electrical signal by the power supplied to said synchronous motor, and means including said multiplying means for producing an output to said means responsive to said third electrical signal which is zero at light loads on said synchronous motor.

6. The apparatus of claim 1 including a second synchronous motor connected in parallel with said first-mentioned synchronous motor, a kilovar transducer coupled to each of said motors for producing electrical signals proportional to the kilovars supplied to the respective motors, and means for comparing said last-mentioned electrical signals for producing correctional signals for said line voltage maintaining means such that the two synchronous motors will share the corrective kilovars that must be generated to maintain a desired alternating current line voltage.

7. The apparatus of claim 1 including a field current control circuit for said synchronous motor and an auctioneering circuit for applying to said field current control circuit the largest of the outputs of said means responsive to said first-mentioned signal and the means responsive to said second signal.

8. The apparatus of claim 7 wherein an error signal is derived for said field current control circuit by comparison of the output of said auctioneering circuit with a signal proportional to actual field current and a signal proportional to the minimum permissible field current to prevent pull-out of the synchronous motor.

* * * * *